(12) United States Patent
Takahashi et al.

(10) Patent No.: US 9,142,940 B2
(45) Date of Patent: Sep. 22, 2015

(54) SWITCHBOARD AND COOLING METHOD THEREOF

(71) Applicant: TOSHIBA MITSUBISHI-ELECTRIC INDUSTRIAL SYSTEMS CORPORATION, Minato-ku, Tokyo (JP)

(72) Inventors: Takehiro Takahashi, Tokyo (JP); Akira Satou, Tokyo (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 313 days.

(21) Appl. No.: 13/890,376

(22) Filed: May 9, 2013

(65) Prior Publication Data

US 2013/0314850 A1  Nov. 28, 2013

(30) Foreign Application Priority Data

May 25, 2012  (JP) ................................. 2012-119498

(51) Int. Cl.
*H02B 1/00* (2006.01)
*H02B 1/56* (2006.01)

(52) U.S. Cl.
CPC . *H02B 1/565* (2013.01); *H02B 1/56* (2013.01)

(58) Field of Classification Search
CPC .................................. H02B 1/56; H02B 1/565
USPC .................................................. 361/676–678
See application file for complete search history.

(56) References Cited

U.S. PATENT DOCUMENTS

| 7,508,663 | B2* | 3/2009 | Coglitore | 361/695 |
| 8,072,756 | B1* | 12/2011 | Janes et al. | 361/695 |
| 2005/0257439 | A1* | 11/2005 | Sarver et al. | 52/79.1 |

FOREIGN PATENT DOCUMENTS

JP  2006-311698  11/2006

* cited by examiner

*Primary Examiner* — Zachary M Pape
(74) *Attorney, Agent, or Firm* — Finnegan, Henderson, Farabow, Garrett & Dunner, LLP

(57) ABSTRACT

There is provided a switchboard including a boards each including an opening portion which is provided in a ceiling surface and configured to exhaust heat, and an intake portion which is provided in a lower portion and configured to taken in cooling air, a fan provided to cover the opening portion of a board of the boards and configured to exhaust air in a horizontal direction to cool the inside of the board, and a duct configured to supply the cooling air from the opening portion of a board not provided with the fan to the inside of the board provided with the fan.

7 Claims, 2 Drawing Sheets

SWITCHBOARD AND COOLING METHOD THEREOF

CROSS-REFERENCE TO RELATED APPLICATIONS

This application is based upon and claims the benefit of priority from prior Japanese Patent Application No. 2012-119498, filed May 25, 2012, the entire contents of which are incorporated herein by reference.

BACKGROUND OF THE INVENTION

1. Field of the Invention

The invention relates to a switchboard that is cooled inside.

2. Description of the Related Art

In general, it is known that forming an opening portion in a ceiling surface is avoided to protect electrical components and others (for example, to avoid short-circuit of electrical components) mounted inside against falling objects. For example, in authentication by Underwriters Laboratories (UL), Inc., of the United States, a size of the opening portion in the ceiling surface is limited.

Therefore, the opening portion provided in the upper portion may be covered with a roof or the like in some cases (see Jpn. Appln. KOKAI Publication No. 2006-311698).

However, when cooling air that has cooled the inside of the switchboard is discharged from the opening portion provided in the ceiling surface, covering this opening portion with the roof or the like results in a decrease in cooling effect.

On the other hand, when the opening portion which is provided in the ceiling surface of the already completed switchboard is to be modified and moved to a side surface or the like, cooling inside the switchboard must be again reviewed. Such reviewing of cooling requires a large quantity of work.

BRIEF SUMMARY OF THE INVENTION

It is an object of the invention to provide a switchboard capable of releasing heat from an opening portion with a covered top in a ceiling surface and efficiently cooling the inside of the switchboard.

In accordance with an aspect of embodiments of the invention, there is provided a switchboard including boards each including an opening portion which is provided in a ceiling surface and configured to exhaust heat, and an intake portion which is provided in a lower portion and configured to taken in cooling air; a fan provided to cover the opening portion of a board of the boards and configured to exhaust air in a horizontal direction to cool the inside of the board; and a duct configured to supply the cooling air from the opening portion of a board not provided with the fan to the inside of the board provided with the fan.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments according to the invention will now be described hereinafter with reference to the accompanying drawings.

Embodiment

Figure 1:
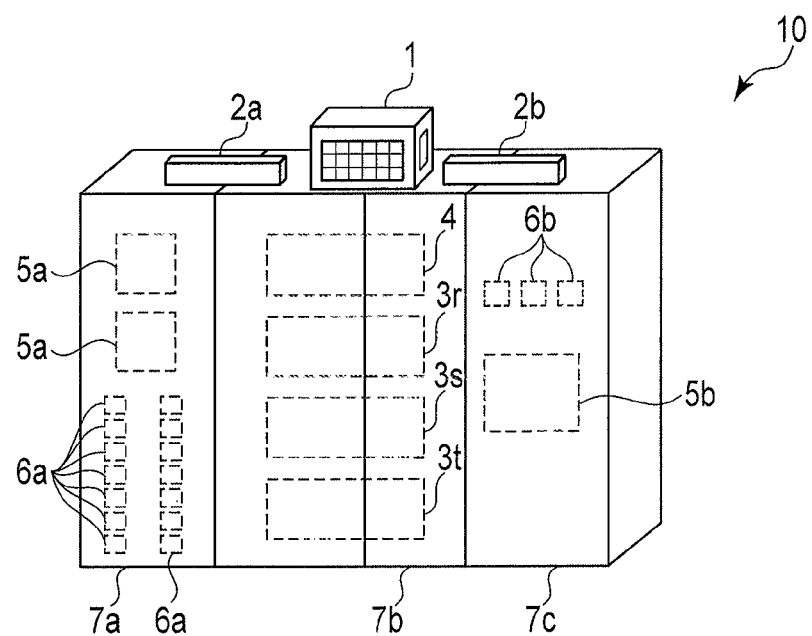
FIG. 1 is a block diagram showing a structure of a switchboard according to an embodiment of the invention.

FIG. 1 is a block diagram showing a structure of a switchboard 10 according to an embodiment of the invention. It is to be noted that like reference numbers denote like parts in the drawings, a detailed description thereof will be omitted, and different parts alone will be mainly explained.

In FIG. 1, in regard to devices denoted by dotted lines, mounting positions of these devices in the switchboard 10 are shown.

The switchboard 10 is a power conversion apparatus including an inverter circuit that converts direct current (DC) power supplied from DC power supplies into three-phase alternating current (AC) power which is supplied to a load. The switchboard 10 includes a fan 1, two ducts 2a and 2b, an input board 7a, a converter board 7b, and an output board 7c.

The input board 7a, the converter board 7b, and the output board 7c are integrally configured. Each of the input board 7a, the converter board 7b, and the output board 7c is constituted of a rectangular parallelepiped housing having each electrical component (i.e., a heat generator) that must be cooled therein.

Two input-side circuit breakers 5a and input-side fuses 6a are mounted inside the input board 7a. Three semiconductor units 3r, 3s, and 3t and a reactor unit 4 are mounted inside the converter board 7b. An output-side circuit breaker 5b and output-side fuses 6b are mounted inside the output board 7c.

The DC power supplies are connected to the input board 7a. The input board 7a supplies DC power fed from the DC power supplies to the converter board 7b. The input-side circuit breakers 5a are devices that disconnect and connect circuits that connect the DC power supplies with semiconductor units 3r to 3t in the converter board 7b. Each of the input-side circuit breakers 5a is provided on a positive electrode side and a negative electrode side. Each of the input-side fuses 6a is provided in accordance with each DC power supply. Furthermore, the input-side fuses 6a are provided on a positive electrode side and a negative electrode side of a ground circuit, respectively.

The input-side circuit breakers 5a and the input-side fuses 6a are electrical components that must be cooled. However, calorific values of these electrical components are not as high as that of a semiconductor such as a switching element. Therefore, if an opening portion in a ceiling surface is not covered, the input board 7a can be sufficiently cooled based on natural air cooling.

The converter board 7b coverts the DC power supplied from the input board 7a into AC power and supplies the converted power to the output board 7c. Each of the three semiconductor units 3r to 3t constitutes a circuit of each phase. Each of semiconductor units 3r to 3t converts the DC power into AC power of R-phase, S-phase, or T-phase. Each of semiconductor units 3r to 3t is constituted of a switching element such as an insulated gate bipolar transistor (IGBT). Reactors corresponding to three phases are mounted in the reactor unit 4. The reactor unit 4 is provided on an output side of semiconductor units 3r to 3t. The reactor constitutes a filter circuit that suppresses a higher harmonic wave together with a non-illustrated capacitor.

The semiconductor units 3r to 3t and the reactor unit 4 are electrical components that must be most seriously cooled in the switchboard 10. Therefore, the inside of the converter board 7b must be cooled based on forced air cooling.

The output board 7c supplies the AC power fed from the converter board 7b to the load. The output-side circuit breaker 5b is a device which disconnects and connects circuits that connect semiconductor units 3r to 3t in the converter board 7b to the load. The output-side circuit breaker 5b disconnects and connects the circuits corresponding to three phases. Each of the output-side fuses 6b is provided on the load side in accordance with each phase.

The output-side circuit breaker 5b and the output-side fuses 6b are electrical components that must be cooled. If the opening portion in the ceiling surface is not covered, the output board 7c can be sufficiently cooled based on natural air cooling like the input board 7a.

The fan 1 is a device configured to perform forced air cooling. The fan 1 is provided on the upper portion of the converter board 7b. An opening portion from which exhaust heat (heated cooling air) is discharged is provided in a ceiling surface of the converter board 7. The fan 1 is disposed to cover the opening portion. The fan 1 sucks air in the converter board 7b in the vertical direction and discharges the same in the horizontal direction.

Figure 2:
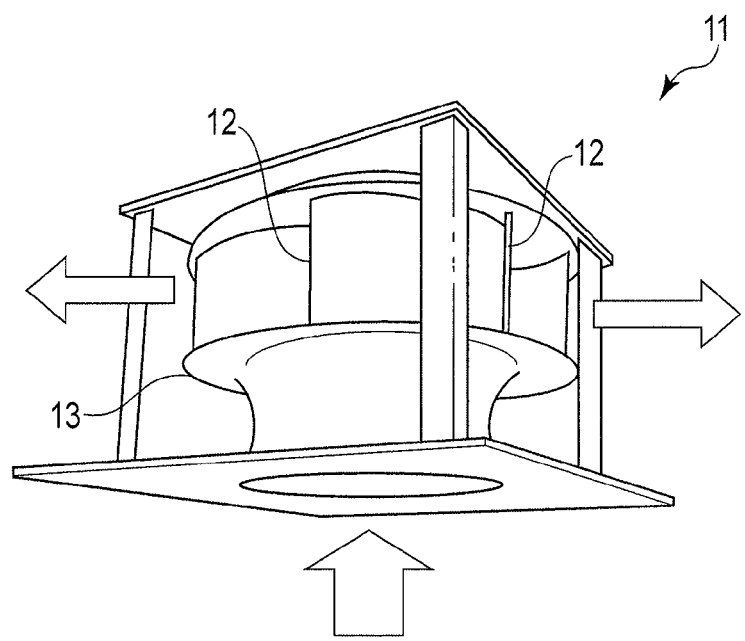
FIG. 2 is a block diagram showing a structure of a fan main body according to the embodiment of the invention.

FIG. 2 is a block diagram showing a structure of a fan main body 11 according to the embodiment.

The fan 1 is configured to cover a fan main body 11 with a cover.

The fan main body 11 is a sirocco fan (a multiblade fan). The sirocco fan is a fan that utilizes the same principle as a water wheel. Further, a static pressure of the sirocco fan can be increased as compared with a propeller fan or the like. Blades 12 are disposed to the sirocco fan main body 11. Each blade 12 is bent and extended in such a manner that its width direction is a vertical direction and a spire is described in a horizontal direction. When an impeller 13 having the blades 12 disposed thereto rotates in the horizontal direction, air in the converter board 7b is sucked in the vertical direction and discharged from each space between the blades 12.

Many grid-like holes for heat release are provided in four sideboards of the cover that cover the fan main body 11. The cooling air sucked by the fan main body 11 is discharged to the outside from the many holes in the sideboards. It is to be noted that, in the top board of the cover that covers the fan main body 11, the opening portion is not provided at all, or the opening portion is small even if it is provided (equal to or below a predetermined size in the UL authentication).

A duct 2a is provided to cut across upper portions of the input board 7a and the converter board 7b. On the input board 7a side of the opening portion where the fan 1 on the ceiling surface of the converter board 7b is provided, an opening portion is further provided. The opening portion from which exhaust heat is discharged is provided in the ceiling surface of the input board 7a. Duct 2a is provided to connect the opening portion provided on the input board 7a side of the fan 1 of the converter board 7b to the opening portion of the input board 7a. Duct 2a is a path for the cooling air through which the cooling air that has cooled the inside of the input board 7a is supplied to the converter board 7b.

A duct 2b is provided to cut across upper portions of the output board 7c and the converter board 7b. On the output board 7c side where the fan 1 on the ceiling surface of the converter board 7b is provided, an opening portion is further provided. In the ceiling surface of the output board 7c, the opening portion from which the exhaust heat is discharged is provided. Duct 2b is provided to connect the opening portion provided on the output board 7c side of the fan 1 of the converter board 7b to the opening portion of the output board 7c. Duct 2b is a path for the cooling air through which the cooling air that has cooled the inside of the output board 7c is supplied to the converter board 7b.

Figure 3:
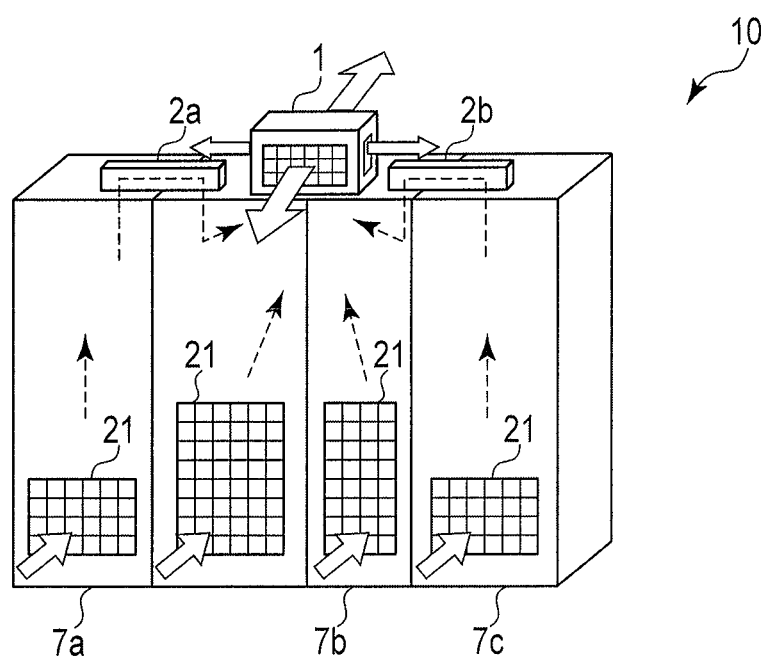
FIG. 3 is a block diagram showing a flow of cooling air in a switchboard according to the embodiment of the invention.

FIG. 3 is a block diagram showing a flow of the cooling air in the switchboard 10 according to the embodiment. Each arrow in FIG. 3 represents a flow of the cooling air.

Convection of the cooling air is produced by rotation of the fan 1.

An intake opening portion 21 is provided to a lower portion of each of the input board 7a, the converter board 7b, and the output board 7c. The air serving as the cooling air is taken into each of boards 7a to 7c from the intake opening portion 21.

The cooling air than has been taken in from the intake opening portion 21 of the input board 7a moves up in the board and sequentially cools the input-side fuses 6a and the input-side circuit breakers 5a. The cooling air that has cooled the input-side fuses 6a and the input-side circuit breakers 5a passes through duct 2a and is taken into the converter board 7b. At this time, the cooling air does not come into contact with the outside air through duct 2a. The cooling air that has been taken into the converter board 7b is discharged to the outside by the fan 1.

The cooling air that has been taken in from the intake opening portion 21 of the converter board 7b moves up in the board and sequentially cools semiconductor units 3r to 3t and the reactor unit 4. The cooling air that has cooled semiconductor units 3r to 3t and the reactor unit 4 is discharged to the outside by the fan 1.

The cooling air that has been taken in from the intake opening portion 21 of the output board 7c moves up in the board and sequentially cools the output-side circuit breaker 5b ad the output-side fuses 6b. The cooling air that has cooled the output-side circuit breaker 5b and the output-side fuses 6b passes through duct 2b and is taken into the converter board 7b. At this time, the cooling air does not come into contact with the outside air through duct 2b. The cooling air that has been taken into the converter board 7b is discharged to the outside by the fan 1.

According to the embodiment, each of the input board 7a, the converter board 7b, and the output board 7c constituting the switchboard 10 can release heat from the opening portion in the ceiling surface whose upper portion is covered and can efficiently cool the inside of each board by using the fan 1 provided to cover the opening portion in the ceiling surface of the converter board 7b.

Here, circuit breakers 5a and fuses 6a mounted on the input board 7a and the output board 7c are electrical components that can sufficiently perform cooling based on natural air cooling if the upper surface of the opening portion of in the ceiling surface is not covered.

Therefore, each of the input board 7a and the output board 7c has a structure that the cooling can be effected by connecting the opening portion in the ceiling surface to the opening portion of the converter board 7b which is a board for forced air cooling through each of ducts 2a and 2b even though the upper surface of the opening portion in the ceiling surface is covered. Consequently, as compared with a case where a fan for forced air cooling is provided to each board, a manufacturing cost can be reduced. Further, even if a switchboard which is of the type that heat is released from the opening portion in the ceiling surface has been already completed, this switchboard can be altered like the configuration of the switchboard 10 by disposing the fan 1 and ducts 2a and 2b without again conducting the cooling review.

Moreover, the path for the cooling air that connects the converter board 7b to the input board 7a or the output board 7c is configured to prevent the convection of the cooling air from coming into contact with that of the outside air by using each of ducts 2a and 2b. If the convection of the cooling air comes into contact with that of the outside air, there is concern that dew condensation water produced by dew condensation may fall into the board. On the other hand, in the switchboard 10, when the path for the cooling air is blocked from the outside air by using each of ducts 2a and 2b, it is not necessary to take a countermeasure for the dew condensation water.

Additionally, when each of the input board 7a and the output board 7c is connected to the converter board 7b which is the board for the forced air cooling, the forced air cooling can be effected. As a result, in each of the input board 7a and the output board 7c, the cooling effect can be enhanced more than that of the natural air cooling.

Further, the cooling air discharged from each of the input board 7a and the output board 7c is taken in from the ceiling surface of the converter board 7b. As a result, the cooling air discharged from each of the input board 7a and the output board 7c is discharged from the fan 1 to the outside without passing through the electrical components (semiconductor units 3r to 3t, the reactor unit 4, and others) in the converter board 7b. Therefore, in each of the input board 7a and the output board 7c, the cooling air heated by heat from the electrical components can be prevented from affecting the electrical components in the converter board 7b.

Furthermore, the fan 1 is disposed on the ceiling surface (a ceiling panel) in which the opening portion of the converter board 7b is provided. Therefore, an operator can access the fan 1 without removing the ceiling panel of the converter board 7b. Moreover, the operator can remove the fan 1 alone from the converter board 7b. As a result, the operator can easily perform an operation such as maintenance of the fan 1.

It is to be noted that, this embodiment is constituted of the three boards, i.e., the input board 7a, the converter board 7b, and the output board 7c, but it may be constituted of two boards or of four or more boards. For example, in a switchboard constituted of two boards, when the fan 1 is provided to one of the two boards and the opening portions provided in ceiling surfaces of the respective two boards are connected through one duct 2a or 2b, the same configuration as that in the embodiment can be obtained. Additionally, although the number of the fans 1 to be provided is not restricted, reducing this number to be smaller than the number of the boards enables decreasing a manufacturing cost.

Further, in the embodiment, the switchboard 10 is the power conversion apparatus, but the embodiments are not restricted thereto. If electrical components that must be cooled are mounted on the switchboard 10, any apparatus can be used, and any function can be provided.

Furthermore, in this embodiment, electrical components that must be cooled based on the forced air cooling are mounted on the converter board 7b, but the invention is not restricted thereto. If the opening portion in the ceiling surface of each of boards 7a to 7c is not covered, only the electrical components that can be sufficiently cooled based on the natural air cooling may be mounted. Even in such a case, when the structure like the embodiment is adopted, the opening portion of each ceiling surface is covered, and the cooling based on the forced air cooling having high cooling effect can be carried out.

Additionally, in the embodiment, each of ducts 2a and 2b is configured to connect the opening portions provided in the ceiling surfaces of the respective boards to each other, but the embodiments are not restricted thereto. If the cooling air heated in one board does not adversely affect the electrical components mounted on the other board having the fan 1 provided thereon, the opening portion, which is to be connected to duct 2a or 2b in the board having the fan 1 provided thereon, may be formed in a position, such as a side surface or a lower portion of the board, other than the ceiling surface.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A switchboard comprising:
   boards each including an opening portion which is provided in a ceiling surface and configured to exhaust heat, and an intake portion which is provided in a lower portion and configured to take in cooling air;
   a fan provided to cover the opening portion of a board of the boards and configured to exhaust air in a horizontal direction to cool the inside of the board; and
   a duct configured to supply the cooling air from an opening portion of a board not provided with the fan to the inside of the board provided with the fan.

2. The switchboard according to claim 1,
   wherein the duct connects ceiling surfaces of the two boards.

3. The switchboard according to claim 1,
   wherein the fan is a multiblade fan.

4. The switchboard according to claim 1,
   wherein only electrical components which do not have to be cooled based on forced air cooling are mounted on at least one of the boards when the opening portion thereof is not covered.

5. The switchboard according to claim 1,
   wherein the fan is disposed to be removable from the board.

6. The switchboard according to claim 1, wherein:
   the boards includes an input board, a converter board, and an output board,
   the converter board includes the fan and a power conversion circuit including a switching element,
   the input board includes a direct-current circuit configured to supply direct-current power from a direct-current power supply to the power conversion circuit of the converter board, and
   the output board includes an alternating-current circuit configured to supply alternating-current power output from the power conversion circuit of the converter board to a load.

7. A cooling method of a switchboard including boards, comprising:
   providing, in each of the boards, an opening portion from which heat is exhausted in a ceiling surface and an intake portion from which cooling air is taken in is provided in a lower portion, providing, in a board of the boards, a fan configured to exhaust air in a horizontal direction, to cool the inside of the board and to cover the opening portion of the board, and providing a duct configured to connect the opening portion of the board provided with the fan to the opening portion of the board not provided with the fan.

\* \* \* \* \*

UNITED STATES PATENT AND TRADEMARK OFFICE
CERTIFICATE OF CORRECTION

PATENT NO.        : 9,142,940 B2
APPLICATION NO.   : 13/890376
DATED             : September 22, 2015
INVENTOR(S)       : Takahashi et al.

It is certified that error appears in the above-identified patent and that said Letters Patent is hereby corrected as shown below:

Title page, item (57), in the Abstract, line 1, change "switchboard including a boards each" to --switchboard including boards each--.

Title page, item (57), in the Abstract, line 4, change "to taken" to --to take--.

Claims

Claim 1, column 6, line 34, change "a duct configured to supply the cooling air from an opening" to --a duct configured to supply the cooling air from the opening--.

Signed and Sealed this
Twenty-second Day of March, 2016

Michelle K. Lee
*Director of the United States Patent and Trademark Office*